US011776428B1

(12) United States Patent
Stone et al.

(10) Patent No.: US 11,776,428 B1
(45) Date of Patent: Oct. 3, 2023

(54) SYSTEMS, MODELS, AND METHODS FOR SIMULATING SURGERY ON ANATOMICAL ORGANS

(71) Applicant: University of Rochester, Rochester, NY (US)

(72) Inventors: Jonathan Stone, Rochester, NY (US); Ahmed E. Ghazi, Rochester, NY (US)

(73) Assignee: University of Rochester, Rochester, NY (US)

( * ) Notice: Subject to any disclaimer, the term of this patent is extended or adjusted under 35 U.S.C. 154(b) by 183 days.

(21) Appl. No.: 16/234,420

(22) Filed: Dec. 27, 2018

Related U.S. Application Data

(63) Continuation of application No. 15/299,435, filed on Oct. 20, 2016, now abandoned.

(60) Provisional application No. 62/244,410, filed on Oct. 21, 2015.

(51) Int. Cl.
*G09B 23/30* (2006.01)
*G09B 23/34* (2006.01)

(52) U.S. Cl.
CPC ......... *G09B 23/303* (2013.01); *G09B 23/34* (2013.01)

(58) Field of Classification Search
CPC ....... G09B 23/30; G09B 23/34; G09B 23/303
USPC .......................................... 434/267, 268, 272
See application file for complete search history.

(56) References Cited

U.S. PATENT DOCUMENTS

| | | | | |
|---|---|---|---|---|
| 2,006,666 A | * | 7/1935 | Bridgett | G09B 23/30 264/222 |
| 2,324,702 A | * | 7/1943 | Hoffmann | G09B 23/32 434/272 |
| 5,055,051 A | * | 10/1991 | Duncan | G09B 23/30 434/262 |
| 6,336,812 B1 | * | 1/2002 | Cooper | G09B 23/285 434/262 |
| 7,255,565 B2 | * | 8/2007 | Keegan | G09B 23/286 434/272 |
| 7,845,949 B2 | * | 12/2010 | Wilkins | G09B 23/286 434/268 |
| 7,993,140 B2 | * | 8/2011 | Sakezles | G09B 23/306 434/267 |
| 8,057,236 B2 | * | 11/2011 | Miau | G09B 23/28 434/267 |
| 9,805,624 B2 | * | 10/2017 | Reihsen | G09B 23/28 |
| 10,081,727 B2 | * | 9/2018 | Felsinger | B29C 39/003 |
| 10,573,201 B2 | * | 2/2020 | Tian | B29C 39/10 |
| 10,706,743 B2 | * | 7/2020 | Black | G09B 23/30 |
| 2004/0126746 A1 | * | 7/2004 | Toly | G09B 23/28 434/262 |
| 2012/0015337 A1 | * | 1/2012 | Hendrickson | G09B 23/28 434/267 |
| 2014/0106329 A1 | * | 4/2014 | Watanabe | G09B 23/30 264/219 |

(Continued)

*Primary Examiner* — Joseph B Baldori
(74) *Attorney, Agent, or Firm* — Woods Oviatt Gilman LLP; Katherine H. McGuire, Esq.

(57) ABSTRACT

The invention provides systems and methods for improved simulation of surgical procedures, using models of anatomical organs. The models comprise models of internal components present in the anatomical organ. The models of the internal components are registered to the position which the internal component occupies in the anatomical organ, and in some embodiments the models of the anatomical organ can lose simulated physiological fluids during simulated surgery.

11 Claims, 3 Drawing Sheets

(56) References Cited

U.S. PATENT DOCUMENTS

| | | | | |
|---|---|---|---|---|
| 2014/0302474 | A1* | 10/2014 | Sakezles | G09B 23/303 |
| | | | | 434/268 |
| 2017/0018206 | A1* | 1/2017 | Hofstetter | G09B 23/34 |
| 2017/0032701 | A1* | 2/2017 | Sekino | G09B 23/30 |
| 2018/0033339 | A1* | 2/2018 | Kerins | H04B 10/071 |
| 2018/0061279 | A1* | 3/2018 | Niimi | B33Y 70/00 |
| 2019/0027064 | A1* | 1/2019 | Nelson | G09B 23/303 |
| 2019/0057623 | A1* | 2/2019 | Magsood | G01R 33/58 |
| 2020/0152091 | A1* | 5/2020 | Haga | A61B 5/026 |

\* cited by examiner

SYSTEMS, MODELS, AND METHODS FOR SIMULATING SURGERY ON ANATOMICAL ORGANS

CROSS-REFERENCE TO RELATED APPLICATIONS

This application is a continuation of U.S. application Ser. No. 15/299,435, filed Oct. 20, 2016, which claims the benefit of U.S. Provisional Application No. 62/244,410, filed Oct. 21, 2015; the contents of both applications are incorporated herein by reference

STATEMENT OF FEDERAL FUNDING

Not applicable.

BACKGROUND OF THE INVENTION

Considerable effort has been expended in recent years to improve surgical training for medical students and to allow experienced surgeons to practice approaches before tackling difficult cases. Surgery on animals can give practitioners the feel of tissues and organs, but does not provide an adequate simulation human anatomical structures and dimensions, while surgery on cadavers, which have typically been embalmed, does not provide the "feel" of surgery on living tissues.

One approach to improving surgical training has been the development of surgical models of human organs which can reproduce the anatomy and dimensions of the organs, as aids to simulate the surgical experience. Recently, surgical models have been provided using hydrogels which have been shaped to simulate an organ of choice. U.S. Pat. No. 8,870,576, to Millon et al. ("Millon"), discloses surgical aids formed from hydrogels, which the patent states exhibit some mechanical properties (such as "feel") of organs. Millon further discloses forming a tubular structure within a hydrogel by placing a rod within the hydrogel and then withdrawing it.

There remains in the art a need for better means for simulating the surgical experience, not only for training medical students and surgical residents, but also for training even experienced surgeons on complicated surgeries and for practicing or developing ways to of approach unusual or difficult surgical problems. It would also be advantageous if there was a better means for medical device manufacturers to develop, test and demonstrate use of devices to assist in performing surgery and for filmmakers and others to simulate surgery. Surprisingly, the inventive systems, models, and methods fulfill these and other needs.

PARTIES TO JOINT RESEARCH AGREEMENT

Not applicable.

REFERENCE TO SEQUENCE LISTING OR TABLE SUBMITTED ON COMPACT DISC AND INCORPORATION-BY-REFERENCE OF THE MATERIAL [SPECIFY NUMBER OF DISCS AND FILES ON EACH]

Not applicable.

SUMMARY OF THE INVENTION

In some embodiments, the invention provides systems for simulating surgery on an anatomical organ. In these embodiments, the systems comprise a model of the anatomical organ, the model composed of a crosslinked hydrogel simulating a tactile property of the anatomical organ, and having disposed in the model at least one internal structure or internal void having a size, shape and position within said model mapped to an internal structure or void having a like, shape and position within the anatomical organ. In some embodiments, the systems further comprise a plurality of internal structures or internal voids. In some embodiments, the internal structure or internal void is not linear within the model for more than two contiguous inches. In some embodiments, the internal void is a channel in the hydrogel. In some embodiments, the at least one internal structure is a simulated artery or vein of the anatomical organ. In some embodiments, the simulated artery or vein contains simulated blood. In some embodiments, at least one internal structure or internal void in the model contains a simulated physiological fluid of the anatomical organ. In some embodiments, the simulated physiological fluid is simulated blood. In some embodiments, the anatomical organ being modeled is a kidney or bladder and the simulated physiological fluid is urine. In some embodiments, the anatomical organ being modeled is a brain and the simulated physiological fluid is cerebrospinal fluid. In some embodiments, the anatomical organ is a gall bladder and the simulated physiological fluid is bile. In some embodiments, the system further comprises at least one simulated tumor disposed in or on said model of said anatomical organ. In some embodiments, the tumor is at a position corresponding to a position at which tumors occur in the anatomical organ. In some embodiments, the model contains a plurality of simulated tumors at positions corresponding to positions at which tumors occur in the anatomical organ.

In another group of other embodiments, the invention provides models of an anatomical organ of interest, comprising: a crosslinked hydrogel having the physical shape and size of the organ of interest, which hydrogel simulates a tactile property of the anatomical organ, and having disposed in the model at least one internal structure or internal void having a size, shape and position within the model, which size, shape and position are mapped to a corresponding internal structure or void having a like, shape and position within the anatomical organ of interest. In some embodiments, the model comprises a plurality of internal structures, internal voids, or both. In some embodiments, the internal structure or internal void within the model is not linear within the model for more than five mm. In some embodiments, the internal void is a channel in the hydrogel. In some embodiments, the channel is a simulated artery or vein of said anatomical organ. In some embodiments, the simulated artery or vein contains simulated blood. In some embodiments, the model is connected to a fluid bag external to the model to create a pressure on the simulated blood within the simulated artery or vein. In some embodiments, the pressure on the simulated blood within the simulated artery model is pulsatile. In some embodiments, the at least one internal structure or internal void contains a simulated physiological fluid of the anatomical organ. In some embodiments, the simulated physiological fluid is simulated blood. In some embodiments, the anatomical organ of interest is a kidney or bladder and the simulated physiological fluid is urine. In some embodiments, the anatomical organ of interest is a brain and the simulated physiological fluid is cerebrospinal fluid. In some embodiments, the anatomical organ of interest is a gall bladder and the simulated physiological fluid is bile. In some embodiments, the model comprises at least one simulated tumor. In some embodiments, the simulated tumor is at a position corresponding to a position at which tumors occur in the anatomical organ of interest. In some embodiments, the model comprises a plurality of simulated tumors at positions corresponding to positions at which tumors occur in the anatomical organ. In some embodiments, one or more models of organs are covered with one or more layers of additional tissue, such as fascia, fat or muscle or a combination thereof, that in the body would be encountered in the course of operating on the organ of interest. In some embodiments, to provide a better simulation of surgery on the organ of interest as it is found in the body, the model of the organ is disposed in a model of the abdomen or of the torso, with models of other organs disposed around the organ of interest in the configuration in which they are found in the body.

In a further group of embodiments, the invention provides methods for simulating surgery on an anatomical organ of interest. These methods comprise providing a crosslinked hydrogel model having a shape and size corresponding to a shape and size of the said anatomical organ of interest, which hydrogel simulates a tactile property of the anatomical organ, and having disposed in the model at least one internal structure or internal void having a size, shape and position within the model, which size, shape and position are mapped to a corresponding internal structure or void having a like, shape and position within the anatomical organ, and allowing simulated surgery to be conducted on said model, thereby simulating surgery on the anatomical organ of interest. In some embodiments, the model comprises at least one channel corresponding to least one artery or vein in the anatomical organ, the channel containing a first simulated physiological fluid. In some embodiments, the method further comprises the step of collecting any of the first simulated physiological fluid released from the model during the simulated surgery. In some embodiments, the method further comprises measuring the collected first simulated physiological fluid released during the simulated surgery to obtain a first measurement of loss of the first simulated physiological fluid during the simulated surgery. In some embodiments, the method further comprises determining an average of loss of the first simulated physiological fluid during simulated surgery on a like model of the anatomical organ by a group selected from the group consisting of (i) medical students, (ii) surgical residents, and (iii) surgeons with a board certification encompassing surgery on the anatomical organ, and comparing the first measurement of loss of the first simulated physiological fluid during said simulated surgery against the average of the first simulated physiological fluid lost during simulated surgery by of any of groups (i), (ii) or (iii). In some embodiments, the model of the anatomical organ of interest comprises a second physiological fluid, which second physiological fluid occurs in the anatomical organ of interest either normally or in a pathologic condition of interest. In some embodiments, the second physiological fluid is disposed within the model in an internal structure or void corresponding to where the second physiological fluid occurs in the anatomical organ of interest. In some embodiments, the method further comprises the step of collecting any of the second simulated physiological fluid released from the model during the simulated surgery. In some embodiments, the method further comprises measuring the collected second simulated physiological fluid released during said simulated surgery to obtain a first measurement of loss of the second simulated physiological fluid during the simulated surgery. In some embodiments, the method further comprises determining an average of loss of the second simulated physiological fluid during simulated surgery on a like model of the anatomical organ by a group selected from the group consisting of (i) medical students, (ii) surgical residents, and (iii) surgeons with a board certification encompassing surgery on said anatomical organ, and comparing said first measurement of loss of said second simulated physiological fluid during said simulated surgery against said average of any of groups (i), (ii) or (iii). In some embodiments, the method further comprises collecting all simulated fluids released during simulated surgery on the model of the anatomical organ. In some embodiments, the fluids may be collected separately, while in other embodiments, they may be collected together. In some embodiments, the method further comprises measuring the collected all simulated fluids released during the said simulated surgery to obtain a first measurement of loss of all of the simulated fluids during the simulated surgery. In some embodiments, the method further comprises determining an average of loss of the second simulated physiological fluid during simulated surgery on a like model of the anatomical organ by a group selected from the group consisting of (i) medical students, (ii) surgical residents, and (iii) surgeons with a board certification encompassing surgery on the anatomical organ, and comparing the first measurement of loss of said the simulated physiological fluid during said simulated surgery against the average of any of groups (i), (ii) or (iii). In some embodiments, the method further comprises.

In some embodiments, the invention provides methods for comparing performance by a first practitioner in a simulated surgery on a model of an anatomical organ to the performance of a second practitioner on simulated surgery on a model of the same anatomical organ, the method comprising: (a) providing a first model of the anatomical organ, the first model composed of a crosslinked hydrogel simulating a tactile property of the anatomical organ, and having disposed in the model at least one internal structure or internal void having a size, shape and position within the model mapped to a corresponding internal structure or void having a like, shape and position within the anatomical organ, wherein the at least internal structure or internal void contains a specified simulated physiological fluid of the anatomical organ, (b) having the first practitioner perform a specified simulated surgery on the anatomical organ, (c) collecting the specified simulated physiological fluid released during the simulated surgery to obtain a first measurement of the amount of the simulated physiological fluid lost during the simulated surgery by the first practitioner, and (d) comparing the first measurement of the specified simulated physiological fluid lost during the simulated surgery against a second measurement, which second measurement is of the specified physiological fluid lost in a like specified simulated surgery on a like second model of the anatomical organ by the second practitioner, wherein a loss of less of the specified physiological fluid during the simulated surgery by the first practitioner indicates that the first practitioner performs as well or better than the second practitioner and a loss of more of the specified physiological fluid indicates that the first practitioner performs worse than the second practitioner, thereby comparing the performance by the first practitioner in performing said simulated surgery to that of the second practitioner. In some embodiments, the simulated physiological fluid is simulated blood. In some embodiments, the second practitioner is (i) a medical student, (ii) a surgical resident, or (iii) a surgeon with a board certification encompassing surgery on the anatomical organ. In some embodiments, the method comprises collecting a first total of all simulated physiological fluids released during the simulated surgery on the first model of the anatomical organ and a second total of all simulated physiological fluids released during the simulated surgery on the like second model of the anatomical organ and comparing the first total to the second total.

BRIEF DESCRIPTION OF THE DRAWINGS

FIG. 1 is a photograph showing an early embodiment in which a white block 101 has had a cavity 102 formed within it to provide a mold of half of a kidney. When later filled with hydrogel, the negative space 102 will create a model having the exterior geometry of the kidney.

FIGS. 2A and 2B are photographs of an exemplar pair of 3D printed molds of the interior geometry (FIG. 2A) and exterior geometry (FIG. 2B) of half of a longitudinal section of calyxes, renal pelvis and ureter.

FIG. 3 shows a model of an idealized kidney with 3 tumors and a calyx system that can hold simulated urine.

FIG. 4 is a photograph of a portion of a surgery to resect a simulated tumor from a model of a kidney, using a da Vinci® surgical system. Simulated blood from a simulated blood vessel feeding the tumor is visible around the surgical device.

FIG. 5 is a schematic diagram showing aspects of mapping internal structures or features of a model organ by using "suspension cables" such as wires or filaments to position the internal structures or feature so that they appear in the correct anatomical position in the model (or, for structures intended to appear in a position found only in a pathological condition, in the anatomical position found in the pathological condition.)

DETAILED DESCRIPTION

Figure 1:
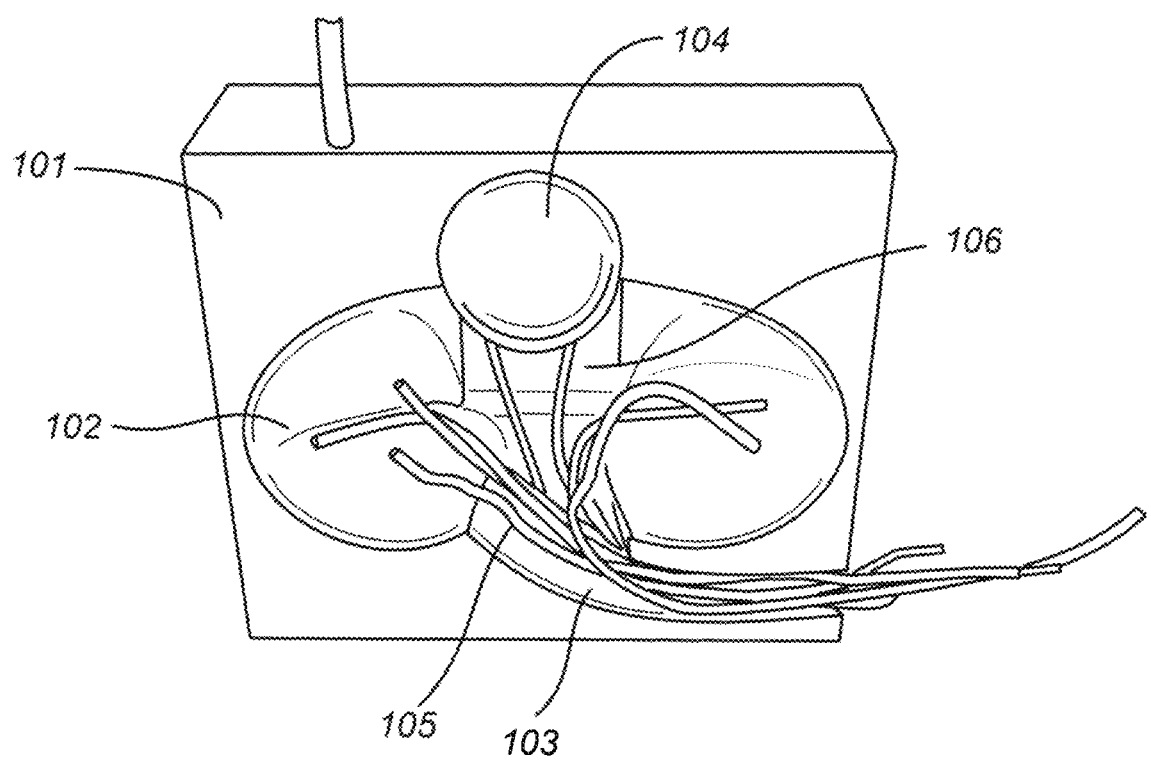
FIG. 1.

Training surgeons to perform surgery on organs, and particularly on anatomical features specific to pathological conditions, is important to improving patient outcomes and reducing healthcare costs. In initial studies underlying the work disclosed herein, the inventors had volunteer practitioners of three different levels of expertise, medical students, surgical residents, and board certified surgeons, perform simulated surgery on hydrogel models of an exemplar anatomical organ to determine how well surgery on such models recreated the experience of operating on the anatomical organ itself. The time spent by each of the volunteers in performing the surgery was recorded.

The inventors found that, for each level of expertise, the duration of surgery by the volunteers on the hydrogel models of the exemplar anatomical organ was markedly shorter than the duration of surgery on the actual anatomical organ, suggesting that surgery on the hydrogel models failed to recreate the experience of surgery on the actual anatomical organ. To understand this, the inventors interviewed the practitioners. The practitioners indicated that, although the hydrogel models felt and looked like the anatomical organ, the models failed to engage the practitioners' interest, and so the practitioners moved through the simulated surgery without exercising the care and precision they would have exercised in actual surgery. Further inquiry revealed this lack of engagement was because the models did not bleed. More specifically, the model organs did not provide feedback by showing the bleeding consequent to cutting major vessels in the anatomical locations in which they would be found in the anatomical organ. Without this visual feedback, there was no drawback during the simulated surgery to cutting a blood vessel the practitioner would normally take care to avoid during actual surgery. Moreover, without a sense of overall blood loss during the simulated surgery, the practitioner did not have a sense of urgency, whereas in actual surgery, reducing the duration of the surgery while minimizing overall blood loss are important, but competing, metrics of the surgeon's performance. The inventors concluded that surgery on organ models that do not simulate loss of blood from major vessels (and by extension, other fluids found in any particular organ being operated on) is of limited value in creating an experience that simulates actual surgery.

Surprisingly, the inventors have solved some of the problems not addressed by previous physical and hydrogel models. The inventive systems, models, and methods provide feedback to the practitioner and provide a more accurate simulation of surgery than previously available surgical systems and models. Furthermore the inventors found that the metrics of performance measured using the inventive systems, models and methods correlated to the same metrics of performance in human surgery. Therefore, use of the inventive systems, models and methods are believed to allow the practitioner to compare the metrics of his or her performance to the same metrics of performance of other practitioners at the same level of experience, or at greater or lesser levels of experience. Moreover, the inventive systems, methods and models allow professors, preceptors, and certification groups to compare performance parameters for a practitioner's surgery on the inventive models to averages of practitioners on the inventive models to determine the level of skill attained by the practitioner at the time the simulated surgery was performed and to predict future performance in surgery on patients. And, the systems, models and methods provide improved ability to test or demonstrate surgical robots or other aids to performing surgery, or to simulate surgery for cinematographic or other uses.

The inventive systems, models, and methods allow for simulating internal structures or pathology in the organ model, such as tumors that involve a portion of the organ or vascular malformations, with the internal structures or pathology registered to be in the correct anatomic position. Further, in some embodiments, they allow full procedural simulation using fluids that mimic physiological fluids relevant to the organ of interest, such as simulated blood that can leak from incisions in the organ model. In some embodiments, the systems and methods allow for simulated blood vessels to be connected to an external fluid source creating a pressure in simulated blood vessels and, in some embodiments, to be connected to a device that provides pulses of pressure to simulate the natural pulse of blood in the organ being modeled.

OVERVIEW

This section provides an overview of aspects of the inventive systems and methods and models. Aspects that need more detailed discussion are then addressed in succeeding sections.

The inventive systems and models can be made for most if not all organs. For ease of reference, the particular organ being modeled for simulated surgery will generally be referred to herein by one of the following terms: the "target organ", the "subject organ", or the "organ of interest".

A model of an organ of interest is preferably made with the exterior geometry (or "outside geometry") of that organ. The making of molds for use in crafts, art and sculpture, is well known, and many techniques traditionally used in making such molds, such as casting or carving, can be used or readily adapted for making molds useful in the inventive systems and models. It is assumed that persons of skill are familiar with these techniques, but a brief description will be presented here as background for methods for making the models used in some embodiments of the invention.

As persons familiar with modeling and casting are aware, molds have hollow cavities with an interior surface. When casting material is flowed into the hollow cavity and solidified, the resulting "piece" or "casting" has an exterior shaped by the interior surface of the mold. The shape of the casting produced by solidifying material in a mold may therefore be thought of as the positive shape of the negative shape formed by the interior surface of the mold. The interior surfaces of molds used in the inventive systems and methods are therefore designed to be negative spaces which, when casting material is flowed into them, will result in castings which reproduce the exterior surface, size and shape of the organ of interest or of a selected structure within the organ. (As discussed further within, selected structures are typically cast so that they may be later positioned within a model of the organ.)

Molds used to form organ models for use in the inventive systems and methods can be made by any of a number of conventional methods. It is assumed that persons of skill are familiar with these conventional methods, but two will be mentioned as examples. One method that can be used is so-called "bi valve molding," which uses two molds. Typically, the two molds are longitudinal sections and are usually sagittal sections. To obtain such sections, a "parting line" is drawn along the exact middle of the object to be modeled, the molds of each half are made, and the molds are registered to each other so that when the two molds are joined together, or the casts from each mold are joined together to assemble the model, they will align perfectly. A second example is "piece-molding," which uses more than two molds, each of which relates to a different contiguous portion of the object and which together are assembled to form a model of the entirety of the object. For convenience, the discussion below will generally be phrased with the assumption that two molds are used and that the molds are symmetrical halves. It will be understood, however, that unless otherwise required by logic or context, more than two molds could be used to together provide pieces that together will constitute the entirety of the organ of interest being modeled. It will also be noted that, for convenience of reference, it will be assumed that the two molds being used are symmetrical halves of the organ being molded, but that in many cases the molds can be of any two complementary proportions adding up to 100% of the organ that the moldmaker finds convenient. As the anatomical organs modeled in the inventive systems, models and methods typically have internal structures and voids that require placement and removal of various elements, and given the constraints of having hydrogel crosslinked around such internal structures or voids, when using two molds, their complementary proportions will typically be within about 10% of 50%, such as 45%/55% or 40%/60%, with "about" here meaning 2% plus or minus of the stated percentage. Proportions that do not allow desired internal structures or voids to be registered in the molds to result in having the desired anatomical feature in a position within the model of the organ of interest corresponding to that of the natural or pathological internal structure or void can be readily determined by the practitioner and are not preferred.

In some embodiments, molds can be made by placing a blanket of silicone or mold rubber around an organ from a cadaver and then forming a hardshell, or "mother" mold over the silicone or mold rubber, from which one or more castings can then be made. In some embodiments, the mold can be made using 3D printing. Three dimensional printing not only is convenient, but also makes it relatively easy to create models of pathology, such as exophytic or endophytic tumors or vascular abnormalities, which can useful in training surgeons in difficult or less common surgical problems. Some embodiments of the inventive systems and methods contemplate that the model of the subject organ comprises internal voids, structures, or both, which are present in the subject organ. In some embodiments, this is accomplished by first forming molds of halves of the exterior of the organ, using the molds to form hollow models of each half, each of which has the internal and external geometries of the relevant half of the organ, placing components to mimic the internal voids or structures in the respective halves, flowing hydrogel into the portion of the hollow of each half that remains around the components, and then joining the two halves together to form a model of the intact organ.

In some embodiments, we have found it convenient to create models of internal voids by freezing ice in the desired shape of the internal void, such as a half of a brain ventricle, and then using the shaped ice as the "positive" mold within the negative mold of, for example, a half of a brain. The positive shaped ice is registered within the negative mold of the organ half being modeled so that when the organ model is complete, the internal feature (such as the ventricle being discussed as an example) will be in the desired physical position within the organ model. Hydrogel is then introduced into the negative mold but can not, of course, flow into the space filled by the ice. The hydrogel is then crosslinked. Where the crosslinking is by the preferred method of freeze/thawing, the ice will melt during the thaw portion, and the melt water will drain out, leaving the desired void. Since use of an ice positive mold allows only a single freeze/thaw cycle, the concentration of the polymer, such as PVA, is typically increased so that the resulting model of the organ being modeled is of a stiffness corresponding to that of the anatomical organ being modeled. It is routine for persons of skill in the art of making hydrogel models to use different combinations of polymer concentrations and numbers of freeze/thaw cycles to result in hydrogel models of particular stiffnesses. Since only one freeze/thaw cycle is used when ice molds are used to model voids in an organ, the practitioner wishing to use ice as a positive mold to model a void in any particular organ to be modeled need only fill some molds with different concentrations of hydrogel, run them through one freeze/thaw cycle, and have them felt by a practitioner familiar with the "feel" of the organ in question to select the one with the stiffness of the organ being modeled. If the stiffness of the crosslinked polymers produced by the particular concentrations used is not quite right, a further set of molds can be filled with polymer at concentrations suggested by the results of the first series to arrive at one producing the stiffness (the "feel") of the organ being modeled.

FIG. 1 depicts an early embodiment in which a white block 101 has had a cavity 102 formed within it to provide a mold of half of a kidney. When later filled with hydrogel, the negative space 102 will create a model having the exterior geometry of the kidney. The lower portion of the mold 102 shown in FIG. 1 further comprises a hollow area 103 in the block exterior corresponding to the external geometry of a structure which, when the mold 102 is filled with hydrogel, will model the renal pelvis and ureter. FIG. 1 also shows a ball 104 which mimics a tumor protruding from the organ. Although not visible in this Figure, the portion of the block behind the ball 104 has a negative space to accept the ball. In some later embodiments, the molds are designed to incorporate models of tumors at positions which present either common or difficult surgical problems, depending on the intended training or practice purpose for the resulting surgical model.

As can also be seen in FIG. 1, elements can be disposed in the hollow interior of the mold 102 of this half of the organ to create models of voids or internal structures in the organ. The elements are preferably mapped or registered to the corresponding locations of the voids or internal structures in the organ being modeled. In FIG. 1, these elements are pliant wires 105 which are disposed to represent the renal artery and vein, as well as a blood supply 106 for the "tumor" 104. (In the example shown in FIG. 1, the wires 105 and 106 enter the mold for the kidney through the area 103.) To complete the model of this half of the kidney, a mix containing hydrogel monomers is allowed to flow into the negative space 102 and the monomers are crosslinked to form a hydrogel polymer of a first desired stiffness, the wires 105 and 106 are gently pulled out, leaving behind void spaces in the hydrogel. In some embodiments the hydrogel polymer is then firmed to a second desired stiffness. For example, if the crosslinking is performed by subjecting the hydrogel to freeze/thaw cycles, the hydrogel monomers may be subjected to a first freeze/thaw cycle, the wires (or any other elements to be removed) removed, and the hydrogel subjected to further freeze/thaw cycles to bring the stiffness up to the stiffness of the subject organ. Alternatively, in some embodiments, the wires or other elements are removed after the crosslinking is completed, but before the assembly of the organ model is completed. In some embodiments, rather than wires 105 and 106, the elements can be filaments of a material which is dissolvable by a solvent that will not dissolve crosslinked hydrogel or which will dissolve the filaments much more quickly than it will the crosslinked hydrogel, allowing the filaments to be dissolved and the solvent removed before too much of the hydrogel is dissolved to affect the utility of the model organ. For example, suppliers such as Maker Bot Industries, Inc. (Brooklyn, NY), sell high impact polystyrene, or "HIPS," as a dissolvable filament for use in 3D printing. HIPS and other styrene filaments are dissolvable in limonene (preferably (R)-(+)-limonene, rather than the more common D-limonene). Once hydrogel has been flowed into the mold and crosslinked to a first desired degree of stiffness, the solvent can then be used to dissolve the filaments, leaving the desired channels or voids.

Figure 2A:
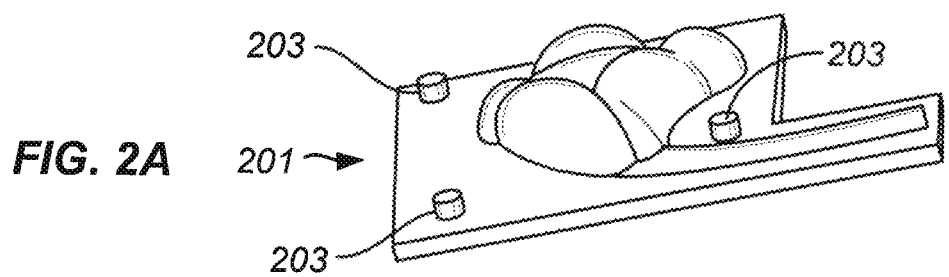
FIGS. 2A and B.
Figure 2B:
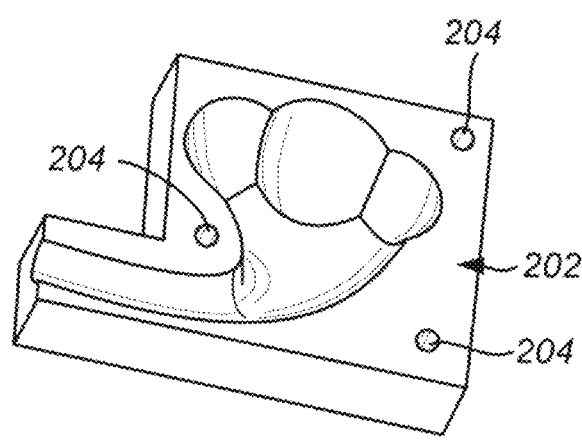

In other embodiments, internal voids and structures can be modeled by creating separate one piece or multiple piece hollow molds for the internal void or structure. FIGS. 2A and B show an exemplar pair of 3D printed molds 201 and 202, of the interior geometry 201 and exterior geometry 202 of half of a longitudinal section of calyxes, renal pelvis and ureter. The interior mold 201 and exterior mold 202 are registered so that when they are mated together and hydrogel is flowed into the resulting combined mold and then crosslinked, the combined mold will create a positive hydrogel model of half of a longitudinal section of calyxes, renal pelvis and ureter. Visible at the edges of FIGS. 2A and 2B are projections 203 and depressions 204 in the molds, which can only be mated when molds 201 and 202 are aligned in the correct orientation. Two of these hydrogel models can then be mated and attached to one another to form a model of the intact calyxes, renal pelvis and ureter. The resulting model of the calyxes can be registered within the cavity of a mold of the kidney. The remaining space within the cavity is then filled with hydrogel, and crosslinked to the degree of stiffness desired by the practitioner, which will usually be a stiffness mimicking that of the organ being modeled.

Figure 3:
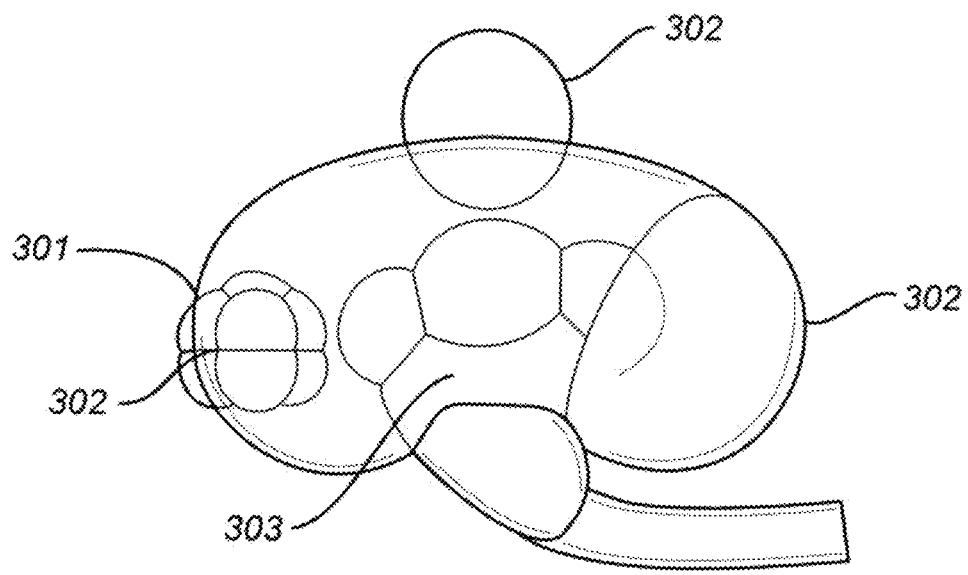
FIG. 3.

FIG. 3 shows a model 301 of an idealized kidney with 3 tumors 302 and a calyx system 303 that can hold simulated urine. The tumors 302 are placed at distances from the calyx to produce differing degrees of difficulty from calyx breach during surgery on the model 301.

In models of the brain, surgical challenges can be simulated by incorporating into the overall model separate models of one or more internal structures such as the ventricles, amydala, hippocampus, pituitary gland, thalamus, hypothalamus, cerebellum and brainstem. These structures are typically separately molded as wholes or halves and registered into molds of the appropriate halves of the brain so that when the overall model is created, the internal structures are in the correct anatomical position.

A similar process using two molds can be used to form simulated blood vessels having a lumen. In some embodiments, the simulated vessel is positioned in the hollow shell of the organ's exterior geometry or, in some embodiments, is placed within the mold of the organ's exterior geometry. The simulated blood vessel is then mapped within the mold of the organ to the internal positions in the organ of the corresponding blood vessel within the organ. In some embodiments, the simulated blood vessel has a distal end that extends beyond the exterior of the organ model. This distal end can be cannulated and attached, typically through tubing, to a fluid bag containing simulated blood, as described further below. Further, pliant wires or other pliable but positionable materials can be placed running from the distal (outside the organ) end, through the lumen, and out the proximal end within the organ, with the portions emerging from the proximal end positioned to simulate the path of smaller blood vessels connected to the larger simulated blood vessel through which the wires or other materials run. Hydrogel is then flowed into the cavity of the mold of the organ. After the hydrogel is crosslinked to the desired degree of stiffness, the wires or other material can be gently withdrawn through the lumen of the simulated blood vessel, leaving behind voids in the hydrogel simulating smaller blood vessels.

Figure 4:
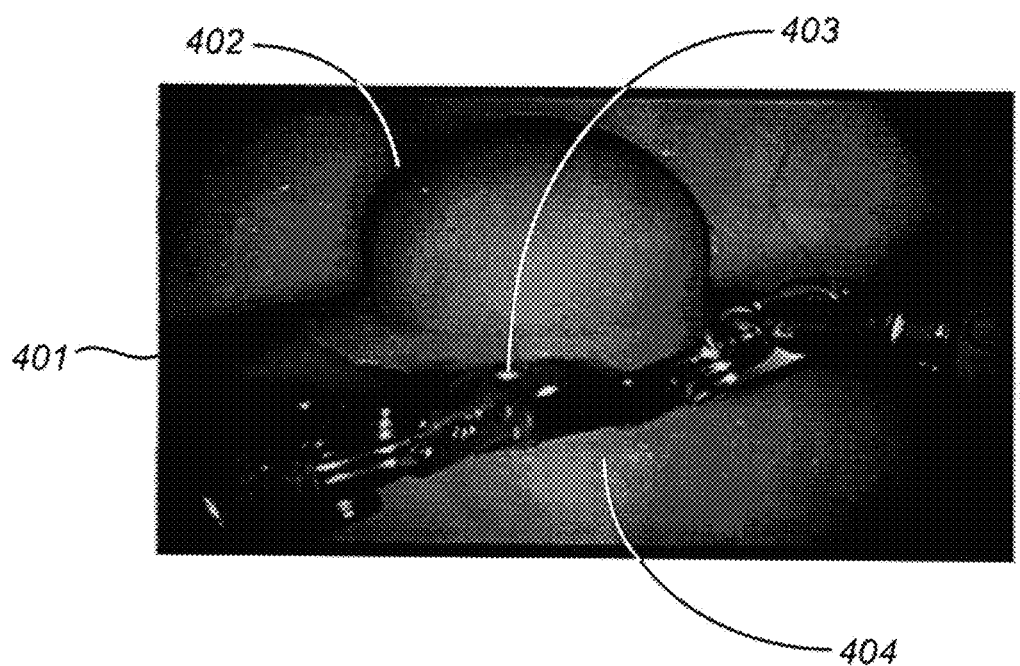
FIG. 4.

As noted, the distal end of the simulated blood vessel can be connected to a fluid bag or other container holding simulated blood. The bag or container can be suspended to provide a simulation of blood pressure to the simulated blood. In some embodiments in which the simulated blood vessel is intended to simulate an artery, such as the renal artery, the extended distal end is attached to tubing connected directly or indirectly to a pump or other device which creates pulses of pressure in the simulated blood, thereby creating a simulation of arterial pulsing in the simulated artery in the organ model. Alternatively, if the simulated blood is in a fluid bag or other flexible container, the bag or other container can simply be rhythmically gently squeezed throughout a simulated surgery to simulate a pulse. FIG. 4 is a photograph showing a portion of a simulated surgery on kidney model 401 in which an exophytic tumor 402 is being resected using a da Vinci® surgical system 403 (Intuitive Surgical, Inc., Sunnyvale, CA). Simulated blood 404 from a simulated blood vessel feeding the tumor 402 is visible around the da Vinci surgical system 403.

The use of simulated blood, other physiological fluids relevant to the simulated organ, or both, not only increases the accuracy of the simulation but also engages the practitioner's attention, unlike surgery on simulated organs that do not show simulate bleeding, which were shown in the studies noted above not to engage the practitioner's attention. In some embodiments, the time taken by a practitioner to perform a particular simulated surgery on the simulated organ (for example, to remove one or more simulated tumors or vascular abnormalities) is timed. For evaluation purposes, the simulated organ operated on by the practitioner can also be examined to determine whether the simulated surgery successfully removed the pathology modeled into the organ (surgeries are not typically performed on normal organs) and the precision and accuracy of the incisions, closing and other technical aspects. The time can then be compared to the average times known in the art to be taken by practitioners of different levels of experience or expertise in similar surgeries to determine whether the practitioner performed at the level expected for someone with the practitioner's level of experience, exceeded it, or was below it.

In some embodiments, simulated blood released during the simulated surgery is measured to determine "blood loss." The "blood loss" can be determined by any of a number of means, such as by collecting the "blood" in a container positioned under the model and then measuring the accumulated "blood," or by measuring or using a known amount of "blood" in the simulated blood vessels at the beginning of the simulated surgery and determining the amount remaining at the end. It is anticipated that simulated blood will be used in all simulated surgeries. A number of organs, however, also contain an additional physiological fluid, such as urine, cerebrospinal fluid, or bile. If the organ whose surgery is to be simulated normally has such an additional physiological fluid present, this fluid can also be simulated by a fluid (such fluids are sometimes referred to herein as "simulants"), which will typically be colored to match the color of the physiological fluid. If physiological fluid has a different color or clarity when a certain pathological condition is are present and the model is intended to simulate surgery on an organ with that condition, the simulant can be colored to be similar to the color of the physiological fluid and agents, such as flour or powdered chalk can be added to reduce the clarity to the cloudiness present in the pathologica condition.

The release of the simulant during the simulated surgery is preferably measured. The amount of simulant released can then be used to compare the practitioner's performance in the same manner as that discussed regarding the amount of simulated blood released. Persons of skill will appreciate that when loss of both blood and a second physiological fluid are to be measured, one can either measure total fluid loss by capturing fluids released during the simulated surgery in a container, or by starting with known amounts of each fluid and then determining the amount of each left at the end of the simulated surgery.

As with the comparison of times discussed above, the amount of simulated blood released, or of a simulant of a second physiological fluid, or both, can be compared to the average amount of blood, physiological fluid, or both, known or determined to be released by practitioners of different levels of experience or expertise in similar surgeries to determine whether the practitioner performed at the level expected for someone with the practitioner's level of experience, exceeded it, or was below it. For operations in which the average amount of loss of blood, of a second physiological fluid, or both, is not known, a database can readily be constructed by, for example, having a number of practitioners from groups such as medical students, surgical residents and board certified surgeons perform simulated surgery on models with defined pathologies, and determining the average loss of fluid or fluids in surgeries by practitioners in each group, which can then be used as a base of comparison for loss of fluid or fluids by practitioners in later simulated surgeries on similar models.

The description above explains systems and methods using models of a single organ. Persons of skill will recognize that models can be made of multiple organs, with the organs disposed in a simulated abdomen or torso to provide a simulation of the organs in their native three dimensional presentation in the body, and comprising one or more layers of hydrogel positioned to simulate connective tissue, fat, and muscle. Such simulated abdomens and torsos provide systems and methods with yet improved simulations of the surgical experience.

Definitions

As used herein, the term "organ" refers to an organ of a mammal. In some embodiments, the organ may be an organ of an animal, such as a cow, pig sheep, dog or cat. In some preferred embodiments, the organ is a human organ.

As used herein, the phrases "organ of interest" and "anatomical organ of interest" are used interchangeably and denote a particular organ which has been selected by the practitioner to practice surgery on that organ.

A "model" of an organ of interest is a crosslinked hydrogel model that is designed to have an intended size and shape of the organ of interest and which, as described below, is crosslinked to have a feel as similar as possible to that of the organ being modeled. The size of the organ will be smaller or larger, depending on whether it is intended to simulate an organ from a pediatric or an adult patient, and its shape may be varied to provide a model of, for example, an organ that has had previous surgery and now presents a challenging surgical problem.

As surgeons, pathologists, anatomists, and other persons who have handled fresh organs will appreciate, the various organs and tissues in the body have characteristic stiffness or softness due to, among other things, a combination of internal structure, the presence or absence of connective tissue, and the composition of their tissues, all of which results in the organ having a characteristic "feel." For example, fat tends to be soft, while muscle is somewhat stiffer. Brains have a softness similar to gelatin, while kidneys are firm. Pathology may also have a characteristic feel. For example, a tumor in an organ may feel softer or harder than the parenchyma or connective tissue normally present in that organ and the presence of the tumor may be detected by a surgeon who extends his or her fingers into an incision and feels the tumor's firmness. The inventive models of organs of interest and of pathology (such as tumors) within organs of interest are intended in part to simulate the stiffness or softness—the "feel"—of the organ or pathology being modeled. This "feel" is sometimes referred to herein as the "tactile property" of the anatomical organ or pathology.

As used herein, the phrase "physiological fluid" refers to a fluid that is normally present in a particular organ of interest, or which is found in that organ in a particular pathological condition. A "simulated physiologic fluid" is a fluid that simulates a physiologic fluid. For example, blood is a physiological fluid present within arteries, veins, or both within most if not all organs and may be simulated by water colored with a red food dye (particularly to simulate arterial blood) or a blue food dye (to simulate venous blood).

As used herein, the terms "mapped" or "registered" in relation to an internal structure or void in a model of an anatomical organ mean that the model of the organ (a) has a model of an internal structure or void occurring in the anatomical organ, either normally or in a pathological condition, and (b) that the model of the internal structure or void is positioned within the model of the organ at a location corresponding to the position of the internal structure or void of the organ being modeled.

In some embodiments, models according to some embodiments of the invention are used to test or to demonstrate the proficiency of a person by comparing the loss of one or more fluids during simulated surgery by that person to the average loss of the same fluid or fluid during simulated surgery on a like model by a group of practitioners selected from (i) medical students, (ii) surgical residents and (iii) surgeons board certified for surgery on the organ of interest (for example, neurosurgeons for simulated surgery on a model of the brain, or urologists for simulated surgery on a model of a bladder). As used herein, the phrase "simulated surgery on a like model of the anatomical organ" means that the model on which simulated surgery is performed by the person whose proficiency is being tested or demonstrated and the models being subjected to simulated surgery by the medical students, surgical residents, or board certified surgeons are of the same size and shape, are of hydrogel crosslinked to the same degree of stiffness (for example, by having the same polymer mix and concentration and having been subjected to the same number of freeze/thaw cycles), have the same modeled internal structures, voids, or both, have the same simulated physiological fluid or fluids disposed in the same way in the same positions and, if one of the fluids is under pressure, the pressure is the same in the model being used by the person whose proficiency is being tested or demonstrated and the models being subjected to simulated surgery by the medical students, surgical residents, or board certified surgeons.

Organs and Blood Vessels

It is contemplated that the inventive systems and methods can be used to model virtually any organ. In addition to the kidney, which was used as an exemplar organ in the studies underlying the present disclosure, other organs which can conveniently be modeled include the bladder, gall bladder, liver, pancreas, uterus, ovaries, heart, lungs, spleen, bowel, and brain. In some embodiments, the organ which can be modeled is an eye ball.

Over the past century, every organ in the body has in the aggregate been operated on hundreds of thousands of times. The range of sizes of each organ both in adults and in children of different ages is therefore well known, as are unusual sizes which certain organs may have due to natural variations or pathology. The liver, for example, may undergo enlargement in a number of conditions, such as infection or a metabolic disorder. It is expected that molds can be created to model organs of different sizes depending on the age of the hypothetical patient and of the condition or pathology to be modeled. In some embodiments, particularly where the practitioner wishes to develop a surgical plan for a patient with a particular pathology, the organ measurements can be taken directly from patient X-ray computed tomography ("CT") scans, magnetic resonance ("MR") imaging, or ultrasound imaging. CT scans or MR imaging can of course also be used to determine the desired size of models for more general training or other applications.

Similarly, practitioners are familiar with the sizes of internal structures and voids within each organ both in adults and in children of different ages, in both normal conditions and in pathological conditions. Ventricles in the brain, for example, are enlarged in patients with normal pressure hydrocephalus. Models made for use in the inventive systems and methods can include internal structures or voids, such as ventricles, sized to represent those of pathologies a surgeon might encounter in the course of surgery on the subject organ.

Finally, every major artery and vein serving every organ in the body has also been operated on in the course of surgery of the organ which that artery or vein serves. Persons who operate on particular organs are well aware of the typical sizes, positions and paths of each major blood vessel providing blood to or draining blood from each organ. It is expected that, in most organs, blood vessels do not follow a linear path. In some embodiments, the simulated blood vessels are not linear for more than 2 contiguous inches. In some embodiments, they are not linear for more than 1 inch. In some embodiments, they are not linear for more than 1 centimeter.

Making Molds

It is expected that persons of skill are generally familiar with at least some of the various techniques for making molds and using them to cast models which have been developed over many years. Many of these techniques can be used in embodiments of the inventive systems and methods.

In some embodiments, molds can be made designed using computer assisted design, or "CAD" software, and in particular three dimensional (3D) modeling using CAD software. A number of CAD programs useful for designing molds for organ models are available and include Solidworks (Dassault Systèmes SOLIDWORKS Corp., Waltham, MA), Rhino 5 (McNeel North America, Seattle, WA), AutoCAD (Autodesk Inc., San Rafael, CA), and SketchUp (Trimble Navigation, Ltd., Sunnyvale, CA).

Molds designed by any of these programs can be printed using a 3D printer, such as the CubePro® (3D Systems, Rock Hill, SC), MakerBot Replicator Desktop 3D Printer, (MakerBot Industries, LLC, Brooklyn, NY), and Form 1+SLA 3D printer (Formlabs Inc., Somerville, MA).

Physiological Fluids

In some embodiments, the inventive systems and methods include fluids simulating one or more physiological fluids that the surgeon might encounter in the course of surgery on the subject organ. As noted above, every organ in the human body has in the aggregate been the subject of thousands of operations over the past century and the fluids likely to be present in both normal and in diseased organs are well known. Fluids for use in the inventive systems and methods will typically be water, with food coloring added to make the color appropriate for the particular fluid being simulated: red for blood, yellow for urine, and green for bile. As cerebrospinal fluid (CSF) is normally clear, in some embodiments, clear water is used to represent CSF. CSF can, however, be red when there is acute bleeding into it, or yellow when old blood or chronic bleeding is present. Dyes of the appropriate colors can be used where the model is intended to present surgical situations in which conditions resulting in these colors would be present. Viscosity of the simulated physiological fluids can be increased where desired to simulate particular conditions by adding agents such as corn syrup or flour. Some conditions cause physiological fluids, such as urine, to become cloudy. If the simulated surgery is intended to be on an organ having a condition which would result in its physiological fluid being, the cloudiness can be simulated by adding an agent, such as flour or powdered chalk, to the simulated physiological fluid.

Hydrogels

The inventive systems and methods contemplate the use of hydrogels to form the organ models. A number of hydrogels are known in the art. In some embodiments, the hydrogels may be a nonbiodegradable synthetic hydrogel prepared from the copolymerization of various vinylated monomers or macromers, such as 2-hydroxyethyl methacrylate (HEMA), 2-hydroxypropyl methacrylate (HPMA), acrylamide (AAm), acrylic acid (AAc),N-isopropylacrylamide (NIPAm), and methoxyl poly (ethylene glycol) (PEG) monoacrylate (mPEGMA or PEGMA), with crosslinkers, such as N,N'-methylenebis(acrylamide) (MBA), ethylene glycol diacrylate (EGDA) and PEG diacrylate (PEGDA). Poly (N-isopropylacrylamide) (PNIPAm) is a thermo-sensitive polymer which can form thermosensitive hydrogels from free radical copolymerizing of NIPAm with cross-linkers like MBA. PEG-based hydrogels can be prepared by radiation crosslinking of PEG or free radical polymerization of PEG macromers. The Millon patent states that hydrogels such as polyvinyl alcohol (PVA), poly(vinyl pyrrolidone) (PVP), poly(ethylene glycol) (PEG), poly(hydroxyethyl methacrylate) (PHEMA), polyurethanes, and polyacrylamide can be used to form surgical training aids. In some embodiments, the monomers are of polyvinyl alcohol.

As persons of skill appreciate, hydrogels are composed of monomers which have been crosslinked to form polymers. Strictly speaking, therefore, a hydrogel does not exist at the point a solution of monomers, with or without an initiating agent or chemical cross-linking agent, is poured into a mold. For ease of reference, however, it will be understood that references herein to pouring a hydrogel into a mold refers to pouring a mixture comprising monomers of the desired hydrogel, along with any initiating agents, catalysts, or other chemicals which may be needed to initiate or facilitate cross-linking the monomers into a hydrogel of the desired stiffness. Forming hydrogels using different monomers and different cross-polymerization techniques are well known in the art, including freeze/thaw cycling, radiation, ultra-violet illumination, and chemical catalysts (reviewed in, e.g., Ahmed, E., "Hydrogel: Preparation, characterization, and applications: A review," J. Adv. Res., 6(2):105-121 (2015)). It is assumed that persons of skill are familiar with these teachings. In some preferred embodiments, the monomers are polymerized by freeze/thaw cycling.

Coloring Organ Models

If desired, coloring agents can be added to the hydrogel so that the model organ has a color more closely mimicking the color and appearance of the subject organ. For example, food colors can be added to the hydrogel monomers prior to casting of the model. In other embodiments, 1% colored, powdered chalk can be added. Higher percentages of colored chalk can be used to create enhanced images or calcified appearance on imaging. Indocyanine green or other near-infrared dyes can be placed into areas representing tumors to allow the practitioner to visualize the area in which resection should be performed using intra-operative devices, such as the SPY ELITE® system (Novodaq Technologies Inc., Bonita Springs, FL). In these embodiments, the tumor model is typically created first and registered to the intended position within the organ mold. The organ is then modeled by flowing hydrogel monomer mix into the mold around the organ and crosslinked.

Crosslinking and Polymerizing the Hydrogel

Once a hydrogel is poured, it is crosslinked, typically to a degree of stiffness approximating that of the subject organ. A variety of means are known in the art, including radiation, chemical cross-linking, and freeze/thawing. Freeze/thawing, in particular, allows for graded polymerization of the hydrogel which progressively harden the hydrogel, leading to the desired stiffness and associated mechanical properties.

The parameters of the hydrogel and polymerization method can be adjusted so that the "feel" of the resulting models closely replicates the feel of the subject organ. For example, one can adjust the concentration of the monomers, typically up to 20% by weight (as the name "hydrogel" implies, the remaining percentage is water), as well as the number of freeze/thaw cycles, from one up to ten, with models of softer organs such as the brain being constructed using a lower concentration of monomers and a lower number of freeze/thaw cycle and firmer organs being made using a higher concentration of hydrogel monomers and a higher number of freeze/thaw cycles. In studies underlying the present disclosure, one of the inventors, an experienced urologist, found that starting with a PVA concentration of 10% which was then subjected to four freeze/thaw cycles subjectively felt like a kidney. It is expected that surgeons are typically familiar with the feel of the organs on which they operate and can feel organ models made with varying concentrations of hydrogel and varying numbers of freeze/thaw cycles or other crosslinking techniques and readily determine whether any particular model has the desired subjective feel of the subject organ.

In some respects, the brain presents a special case for modeling. As persons of skill will appreciate, in vivo, the ventricles of the brain are filled with fluid. As the brain has a "stiffness" somewhat like gelatin, in some embodiments, in which models of the brain are not going to have the modeled ventricles filled with fluid, the hydrogel can be crosslinked by an extra freeze/thaw cycle over that which would otherwise be used so that the model has a degree of stiffness sufficient to keep the ventricles open and preserve the spatial relationships of the ventricles to the exterior surface of the model brain. Conversely, when the ventricles of the model are to be filled with fluid (typically water) before the simulated surgery, and particularly where the fluid is to be placed under pressure to simulate hydrocephalus (by, for example, hanging a bag of fluid outside the model, which bag is connected by a tube to one or more model ventricles in the brain model), the model of the brain is preferably of the normal stiffness of the brain, so that the person performing the simulated surgery will obtain a better simulation of the surgical experience.

In addition to providing models for surgery on the organs themselves, in some embodiments, the inventive systems and methods combine model organs with simulations of other tissues or organs to simulate surgery on portions of the body, such as a torso or an abdomen. In this regard, models or one or more organs may be disposed in a larger hydrogel construct simulating, for example, an abdomen, with hydrogel modeling abdominal muscles and fat. Studies underlying the present disclosure found, for example, that fat could be simulated using PVA monomers at a concentration of 2.5% subjected to 2 freeze/thaws, while muscle could be simulated using PVA monomers at a concentration of 10% subjected to 3 freeze/thaws.

Persons of skill will also appreciate that there are additional variables that affect the stiffness of the model, including the volume of the organ, as the rate at which models freeze and thaw affects stiffness. A larger model will freeze and thaw more slowly and will be stiffer after one cycle than will a model of a smaller organ. Thus, if a model of a kidney is being made on its own at a concentration of 10%, it will reach appropriate stiffness after 4 freeze/thaw cycles, but if being made as part of an abdomen or torso, it will typically be subjected to one freeze/thaw cycle by itself, and then be placed into the larger model of the abdomen or torso and subjected to a second freeze/thaw cycle. Since the model will freeze and thaw more slowly within the model of the abdomen or torso than it does on its own, the model kidney will now have the desired stiffness after the second cycle.

While there may be differences in the particular combinations of monomer concentrations and number of freeze/thaw cycles or other crosslinking methods that are best for creating the stiffness desired to model any particular organ, testing combinations is usual in modeling. It is well within the skill of one in the art to determine the combination of monomer concentrations and freeze/thaw cycles or other polymerization techniques to achieve the stiffness of any particular organ being modeled.

Wires, Removable Elements, and Inner Components

As noted, a variety of elements can be placed in the mold of an organ or portion thereof to allow representation of internal features of an organ, including voids to create the path of blood vessels in the organ. Unfortunately for those creating models, most internal structures and voids in organs are not linear. Accordingly, accurate representation of these structures and voids requires non-linear elements, and these in turn can be problematic to remove once hydrogel has been crosslinked around the element. The inventive systems, models and methods provide models with surprisingly better representation of non-linear structures and voids than has been possible with previous systems.

In some embodiments, the elements used to represent the internal structures or voids are pliant wires. Pliant wires offer a degree of rigidity useful in bending the wires into positions in the mold registered to where the blood vessels appear in the organ, while the pliancy is useful in gently withdrawing the wires after the hydrogel monomers have been introduced into the mold, typically by pouring or injecting, and undergone crosslinking to a first desired stiffness. If necessary, the element, such as the pliant wire, can be suspended in the mold by, for example, suturing it to the side of the mold or securing it to the outside of the mold with, for example, a fine wire.

It will be appreciated that, as the diameter of the blood vessel being modeled becomes larger, wires of the corresponding diameter, even though pliant, may be too firm to be withdrawn without unacceptable tearing of the hydrogel. In such cases, an element pliant at the desired diameter, such as a soft plastic tube or a shoestring can be used. If the pliant element is not sufficiently rigid by itself to maintain the desired shape and position within the mold without support, a thin pliant wire can be threaded through the pliant element to increase its rigidity without losing the desired pliancy.

In some embodiments, more detail or structure may be desired than can be represented by a pliable element, such as a wire or tube. Such inner features of the model organ can be created by creating the feature in parts, using half negative molds with positive inserts that permit the feature to be "shelled." After introducing hydrogel monomer mixture into the mold, the mixture is subjected to an initial crosslinking, for example, by subjecting the mold to a first freeze. The positive inserts are removed leaving a raw surface, and the two "negative" molds are then attached to form the intact hollow feature. For example, if the crosslinking is by freeze/thawing the hydrogels, the casts from each of two half molds can be "glued" together by placing more hydrogel at the seam of the join, mating the two casts, and then subjecting the two molds to a freeze. Upon the subsequent thaw, the hydrogels crosslink, fusing the casts together.

Joining Subparts or Halves to Form Models of Organs

As noted above, in some embodiments, the subject organ is conveniently modeled by using molds of parts of the subject organ (as noted earlier, there can be two molds, in the case of bi valve molding, or three or more in the case of piece casting. For convenience of reference in this section, the term "subpart" refers to a model cast in a mold of a part of the subject organ). As also noted, one or more of these molds will have disposed within it elements simulating internal structures, such as blood vessels, internal voids, or pathology such as an exophytic or endophytic tumor. Hydrogel is introduced into the respective molds to flow around any elements disposed within the mold and fill the mold. The hydrogel is then crosslinked to a desired degree of stiffness. In some embodiments, the crosslinking is by subjecting the hydrogel to at least one freeze-thaw cycle. Cross linking by freeze-thaw cycles is useful, as it provides a convenient way to bring the hydrogel to any desired degree of stiffness within the range of the hydrogel.

As described earlier, in some embodiments, some or all of these elements are intended to be in place in the model of the intact organ. In other embodiments, however, some elements, such as the wires 105 and 106 shown in FIG. 1, are intended to be removed once the hydrogel has reached at least a first degree of stiffness, but before the subparts cast in the molds are joined and attached. If the hydrogel is being crosslinked by subjecting the hydrogel to freeze-thaw cycles, elements to be removed are typically removed after the first freeze-thaw cycle of the component. Where wires are used, they are removed before final assembly of the model (arranging the components in their anatomical positions and attaching), usually after the component has undergone at least its own first round of crosslinking, such as undergoing a freeze/thaw cycle. Wires are typically kept in subparts until the largest part of the component in which the subpart appears (such as the calyx in a kidney or a tumor in a uterus) is completed.

Once any elements that are to be removed have been removed, the models in the separate molds are mated and attached. In some embodiments, the attachment is by suturing the models together. In some embodiments, the attachment is by gluing the models together. In some embodiments, the attachment is by adding a layer of hydrogel to the surfaces to be mated and crosslinking the hydrogel. In some embodiments, the crosslinking is by subjecting the model to at least one freeze-thaw cycle.

Mapping Internal Components of the Model

As noted, the models used in the inventive systems and methods can have disposed within them simulated blood vessels, internal voids, such as brain ventricles or kidney calyxes, pathology such as tumors, and other features. The position and space occupied by the various structures and features within each organ are well known in the art. The terms "registering" or "mapping" simulations of such structures with reference to models of the organs in which they appear denotes that the simulated features or structures are positioned in a mold of a part of a subject organ so that when a model of the subject organ is made using the casting from that mold, the simulated feature or structure will appear in the same position and have the same size and shape as the feature or structure it is intended to simulate. As an example, an artery supplying blood to a particular organ typically enters that organ at a particular position, and in the case of an artery, branches into arterioles and finally capillaries along a defined path. Further, the artery serving each organ has a typical shape and a size which depends on factors such as the size and age of the individual and in some cases pathology. These shapes and sizes are after a century of operations and autopsies well known to practitioners. If desired, the artery (or other structure or internal void in the organ of interest) can be imaged by MRI, CT, or other imaging modalities and the size, shape and position of the organ and internal structures measured on the images or directly entered or mapped into a software program for modeling the organ or structure. As used herein, the phrase "size, shape and position are mapped to a corresponding internal structure or void having a like, shape and position within said anatomical organ" refers to an internal structure or internal void in a model of an anatomical organ that is of the same size and shape, and traversing the same path over the length of that internal structure or void as does the internal structure or void in the anatomical organ being modeled. As noted, the anatomical organ being modeled can be that of a particular individual, which can be of one with a common pathology or of an unusual pathology or a pathology on which the practitioner wishes to practice (except for removing organs for transplant, surgery is not usually performed on organs or on patients that do not have pathology).

The element used to simulate the internal structure or feature may be sufficiently rigid to remain in the desired position within the mold of the organ during the pouring and crosslinking of the hydrogel to create the model of the organ with the internal structure in place. In many embodiments, however, it will be necessary to secure the model of the internal structure or feature in place during at least the initial pouring and crosslinking of the polymer that will form the model organ by, for example, using sutures, thin wires, or fishing line to suspend the model of the internal structure within the mold for the model organ (for convenience, when used in this fashion, a suture, wire, fishing line or other material may be referred to as a "suspension cable").

Use of suspension cables facilitates mapping of the internal structure or feature to a location within the model organ corresponding to the position of the internal structure in the anatomical organ (or, in the case of, for example, a tumor which is not normally present in the anatomical organ, in the desired position within the organ model). In some embodiments, the model of the internal structure is created, and a suspension cable then inserted into and through the model of the internal structure at a position chosen so that, once the cable is attached to the mold of the model organ, the model of the internal structure will be located in the correct position within the model organ once the organ mold is cast within the mold. In some embodiments, the model of the internal structure is created (cast) with a spanning suspension cable within the mold of the internal structure, which effectively mounts the resulting model of the internal structure on the cable when the mold is cast. In these embodiments, once cast, the cable is positioned within the model of the internal structure and has portions extending beyond the model of lengths such that when the cable is fitted into the mold of the organ, and the mold of the organ is cast, the model of the internal structure will be suspended within the resulting model of the organ at a position mapped to the location of the corresponding internal structure in the anatomic organ. This is conveniently accomplished by having the model of the internal structure located at a specific distance along the length of the cable and spanning a specific portion of the internal structure. For example, depending on where the model of the internal structure is to be positioned within the mold of the organ, the cable may run through the center of the model of the internal structure or may run through one side or the other. To suspend the internal structure in some positions, it may be convenient to use more than one cable.

Once the internal structure is created (with or without one or more embedded suspension cables), it is placed in the mold of the anatomic organ so that its location is mapped to the desired spot. This can be achieved by having features in the mold that accept the internal structure, the suspension cable (if one or more is present), or both. For example, if the designer wishes to provide a model organ having a tumor and a blood vessel adjacent to each other in the anterior face of the superior pole of the kidney, both of these inner features can be mounted on a single suspension cable which traverses the mold of the kidney at a specific angle with a specific trajectory such that both inner features lay where they are supposed to be. Alternatively, the features can be on separate cables each with specific angles and specific trajectories to accomplish the same result. Holes can be fashioned in the kidney mold so that the cable or cables can cross through the superior pole of the model kidney and placed off center such that the holes position the internal structures in the anterior face of the model. Persons of skill will appreciate that the specific angles and specific trajectories chosen to accomplish these results will vary according to the specific organ being modeled and the specific internal structures to be modeled, but are easily accomplished.

After the first crosslinking, any suspension cable or cables used are preferably removed. We have found that suspension cables such as polypropylene sutures leave holes fine enough that the holes seal over and leave both the model of the internal structure and of the organ model water-tight. Without wishing to be bound by theory, it is surmised that there are expansive forces on the hydrogel "tissue" that result in closure of the small holes resulting from removal of the suspension cables.

In some embodiments, the model includes pathologies, such as tumors, whose position within a particular organ are not defined by their position in a normal organ, as by definition a normal organ would not contain the pathology. In such instances, the pathology may be registered by where tumors are most commonly found in the subject organ, or may be disposed at positions selected to present a surgical problem of a selected degree of difficulty or complexity.

Figure 5:
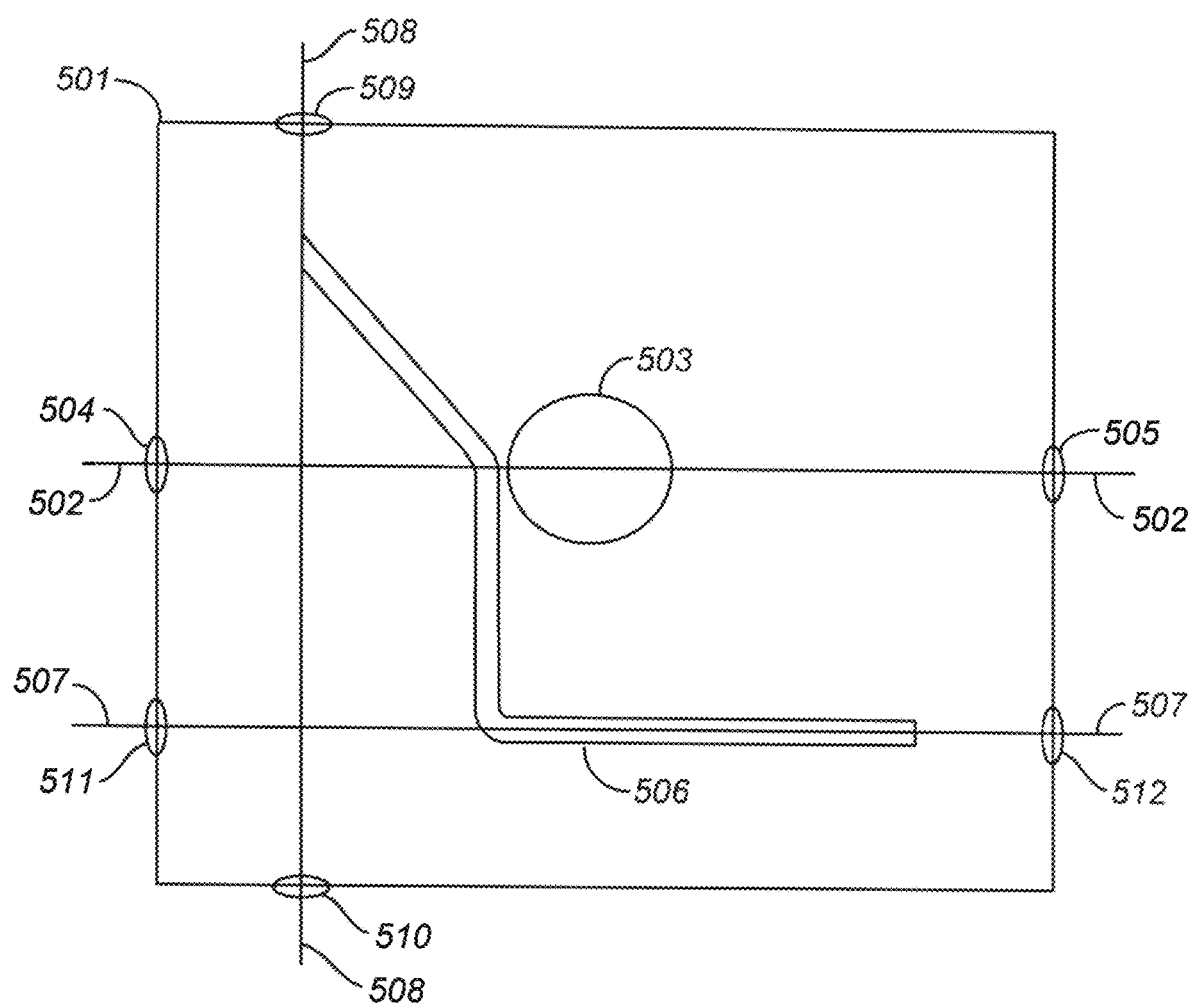
FIG. 5.

Some aspects of mapping internal features to desired positions within the organ model may be better understood by reference to FIG. 5. FIG. 5 is a diagram showing a mold 501 for an organ model. Suspension cable 502 runs through the center of model tumor 503 and is registered within organ mold 501 through holes 504 and 505 (for visibility, holes 504 and 505 are shown as larger than they would be in the model). Tumor 503 is slightly closer to hole 504 so that it is off the midline of the organ model 501. A simulated blood vessel, 506, is mounted on suspension cables 507 and 508. (The points at which simulated blood vessel 506 enters and exits the organ model are not shown in this sectional view.) In this example, suspension cables 507 and 508 do not pass through simulated blood vessel 506, which is instead tied to cables 507 and 508 by a length of fine thread (not shown). Suspension cables 507 and 508 are registered through holes 509 and 510 and holes 511 and 512, respectively (holes 509-512 are shown as larger than they would be in the model so that they can be seen in the figure). This arrangement allows the inner features, such as the tumor and the vessel, to be positioned at what will become selected locations within the model. The polymer mix that will form the organ model is then poured around the tumor 503, vessel 506, and cables 502, 507, and 508, and polymerized, such as by subjecting the polymer mix to one or more freeze thaw cycles, until the model organ is at a degree of firmness desired by the practitioner. Cables 502, 507 and 508 are then removed (by simply pulling them from one end or, if desired and if the cables are made of dissolvable filaments, by dissolving them). The removal or dissolving of cables 502, 507 and 508 leaves the internal structures mapped to the desired positions within the model organ. For convenience of illustration, cables 502, 507 and 508 are shown as straight lines. Persons of skill will recognize, however, that flexible wires (or dissolvable filaments) can be used to create curved paths for the cables if desired to facilitate registration of the internal features.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

The invention claimed is:

1. A system for simulating surgery on an anatomical organ, said system comprising:
    a) a mold for making a model in the shape of an anatomical organ, said mold having first and second opposing mold walls defining an internal mold cavity therebetween in the shape of said model, said internal mold cavity configured to receive a mold material therein to form said model, said mold including first and second holes formed through first and second opposing mold walls;
    b) a unitary suspension cable having first and second opposite ends removably threaded through and releasably secured at said first and second holes, respectively, with the portion of said suspension cable located between said first and second ends fully traversing and suspended within said internal mold cavity between said first and second holes; and
    c) one or more elements removably mounted at a predetermined location along said portion of said suspension cable within said internal mold cavity,
    wherein said one or more elements when mounted within said internal mold cavity forms one or more respective internal structures or internal voids in the molded model upon release and removal of said unitary suspension cable from said first and second holes.

2. The system of claim 1, further comprising the model in the shape of said anatomical organ made from said mold, said model composed of a crosslinked hydrogel simulating a tactile property of said anatomical organ, and having disposed in said internal mold cavity said one or more elements, said at least one or more respective internal structures or internal voids having a size, shape and position within said model mapped to one or more respective internal structures or voids having substantially the same shape and position within said anatomical organ.

3. The system of claim 2, further wherein said model comprises a plurality of said internal structures or internal voids.

4. The system of claim 3, further wherein said at least one internal structure or internal void of said model contains a simulated physiological fluid of said anatomical organ.

5. The system of claim 3, further wherein at least one said internal void in said model is a channel in said material simulating an artery or vein of said anatomical organ.

6. The system of claim 5, further wherein said simulated artery or vein contains simulated blood.

7. The system of claim 2, further comprising at least one simulated tumor disposed in or on said model of said anatomical organ.

8. The system of claim 7, further wherein said tumor is at a position corresponding to a position at which tumors occur in said anatomical organ.

9. The system of claim 7, further comprising a plurality of simulated tumors at positions corresponding to positions at which tumors occur in said anatomical organ.

10. The system of claim 2, further wherein said internal structure or internal void of said model is not linear within said model for more than two contiguous inches.

11. The system of claim 1 wherein at least one of said elements is a structure located within said model following removal of said unitary suspension cable.

* * * * *